UNITED STATES PATENT OFFICE.

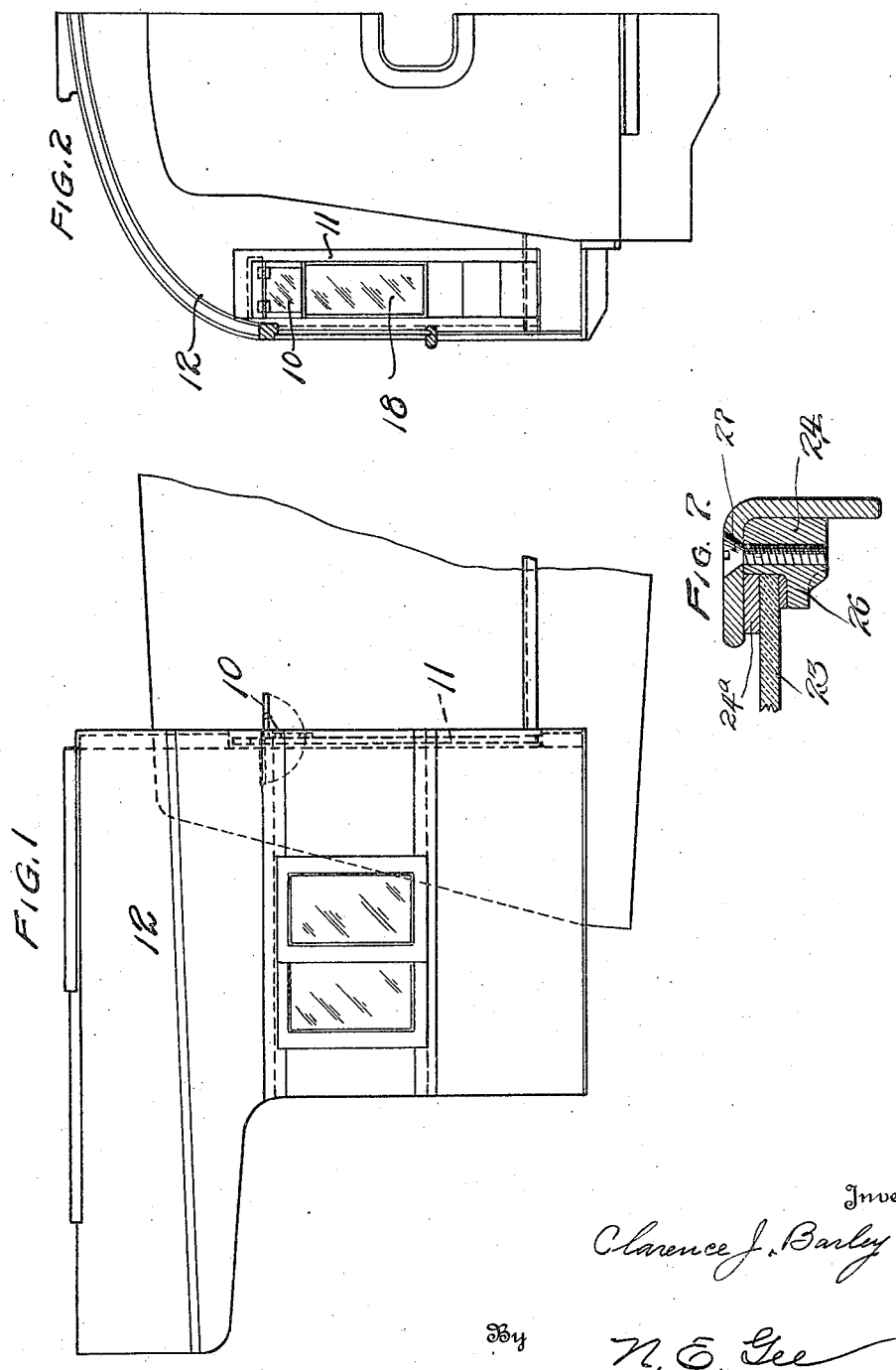

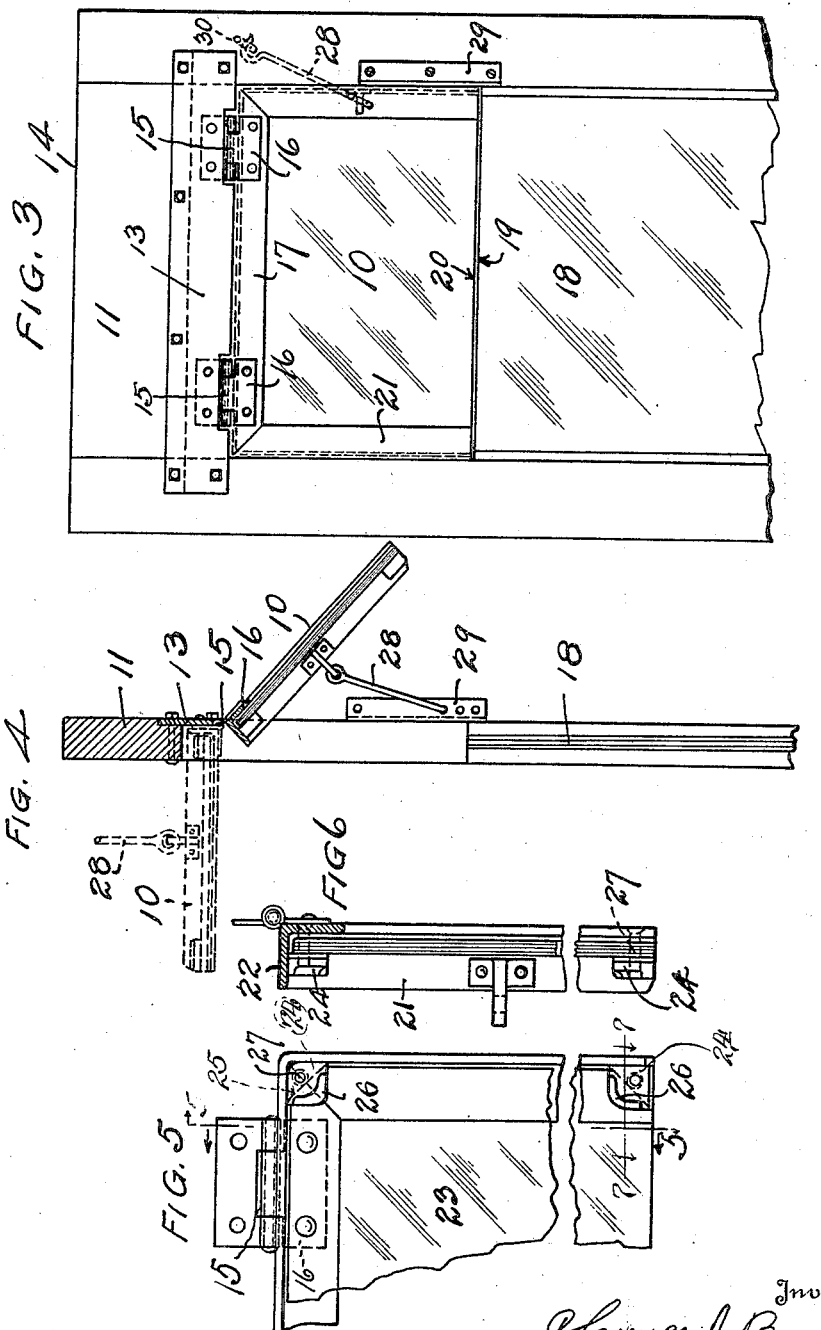

CLARENCE J. BARLEY, OF ALTOONA, PENNSYLVANIA.

LOCOMOTIVE-CAB WINDOW.

1,363,552. Specification of Letters Patent. Patented Dec. 28, 1920.

Application filed January 31, 1918. Serial No. 214,702.

*To all whom it may concern:*

Be it known that CLARENCE J. BARLEY, a citizen of the United States, residing at Altoona, in the county of Blair and State of Pennsylvania, has invented certain new and useful Improvements in Locomotive-Cab Windows, of which the following is a specification.

This invention relates to locomotives and has particular reference to facilities whereby the operation of the locomotive is greatly facilitated through the ability of the engineman and fireman to be able to see the track and block signals at all times through the front cab windows the upper portion of which is so constructed as to be easily swung in or out for the purpose of cleaning the same.

The primary object of this invention is to provide a portion of the front cab window with means for swinging the same into position for easily cleaning the glass and to provide means for locking the glass in any desired position for an unobscured vision as well as to afford a means for ventilation, through the cab front window.

Another object of this invention is to provide means for retaining the glass in the swinging frame within a fixed distance of the fixed or stationary glass in the front cab window.

A still further object of this invention is to provide a front cab door with a window, a portion of which is made rotatable about a horizontal axis, while the door carrying the swinging window is adapted to swing about a vertical axis on the cab structure.

With these and many other objects in view which will be more readily apparent as the nature of the invention is better understood, the same consists of the novel construction, combination, and arrangement of parts as will be hereinafter fully pointed out, illustrated and claimed.

It will be quite readily understood by those skilled in the art to which this invention belongs that the same is susceptible to some structural change or modication without departing from the spirit or scope of the invention, as for instance this invention is readily applicable to the front windows of railway cabin cars, track observation cars, and to all such places where a clear vision is desired, but a preferred and practical embodiment of the invention is shown in the accompanying drawings, in which—

Figure 1 shows a side elevation of a locomotive cab with my invention applied thereto.

Fig. 2 shows a rear end view of a locomotive with the cab attached thereto, and the position my invention occupies with reference to the other cab structure.

Fig. 3 shows an elevational view of the cab front door with the present invention attached thereto.

Fig. 4 shows a sectional view of the cab door frame together with my improved clear vision window shown in one of its forward positions.

Fig. 5 shows in detail the manner of securing the glass in the frame as well as the manner in which the frame is hinged to the front cab door.

Fig. 6 shows a sectional view taken on the line 5—5 of Fig. 5.

Fig. 7 is a cross sectional view taken on the line 7—7 of Fig. 5.

Similar reference numerals refer to similar parts throughout the several figures of the drawings.

In carrying out this invention no change is contemplated in the usual cab structure nor in the frame structure of the front end cab door, hence the invention is readily applicable to cab front doors of existing locomotives and to this end I have constructed a front cab window designated by the numeral 10, within the frame 11 of the front door of a locomotive cab 12.

For the purpose of providing means whereby the clear vision window 10 may be attached to the frame 11 I have positioned a transverse plate 13, near the top 14 of the door frame, having secured thereto a plurality of hinges 15, the lower wings 16 of which are secured to the top 17 of the swinging window 10.

The door frame 11 is usually provided with a glass 18 which in the prevailing construction is continued to the plate 13, but the construction necessitates the opening of the cab front door in order that the glass may be cleaned, and due to locomotives constantly growing larger and the clearance limits remaining the same a point has already been reached with modern locomotives where it is no longer convenient and easy to open the front door for this purpose and in order to provide means whereby that portion of the glass through which the engineman and fireman observe the signals the top portion of the glass 18 has been cut away on a line 19 as shown in Fig. 3 of the drawings to provide the necessary space to position the swinging window 10.

It will be observed that the top edge 19 of the glass 18 and the lower edge 20 of the glass in the window 10 occupy positions immediately adjacent each other, this construction aids in keeping out the rain and likewise the cinders that may be blown back from the stack to the discomfort of the engineman. The inverted U shaped frame 21 of the window 10 is preferably made of angle iron 22. This construction not only provides the necessary rigid construction but forms a convenient means of attaching the hinges 15 at the top of the window.

The glass 23 in the inverted U shaped frame 21 is held in place by suitable glass retaining elements 24 against which the corners 25 of the glass rest, while between the frame and glass a layer of putty 24$^a$ may be used to assist in properly seating the glass in the frame and provide more or less of a cushion between the metal and the glass.

The glass retaining elements 24 are each provided with a flange 26 for retaining the glass as well as bolting means 27 whereby the elements 24 are secured to the frame 21.

The hinges 15 are constructed so as to permit the frame 21 to swing either in or out from the frame 11, and for the purpose of providing means for opening the window any desired amount a hook 28 has been designed, which when coöperating with a perforated angled bracket 29 affords means of opening the window any desired amount and locking the same in position.

For the purpose of locking the window in a closed position there is provided an eye 30 that is positioned in the frame 11 which engages the hook 28 when the window 10 is in a closed position as shown in Fig. 3 of the drawings.

From the above description it is believed that the many advantages of the herein described invention are readily apparent, and what I claim and desire to be secured by Letters Patent is—

1. A clear vision window construction including in combination with the window frame having a fixed transparent section therein, and an opening above said fixed transparent section, a supporting plate secured to the frame at the upper edge of said opening, a transparent panel, hinges for connecting said transparent panel with the said supporting plate whereby the said panel may be swung either forward or backward through the opening above the said fixed transparent section of the window frame, and means for maintaining said panel in an open position.

2. A clear vision window construction including in combination with the window frame having a fixed transparent panel therein and an opening above the said panel, a carrier plate secured to the upper side of said frame and provided with notches, hinges fastened to said plate and having their pintle portions disposed in said notches, a transparent panel carried by said hinges, and means for holding said panel at an angle on either the front or rear side of said window frame.

3. A clear vision window construction including in combination with the window frame having a fixed transparent panel therein and an opening above same, a carrier plate secured to one side of said opening, hinges secured to said plate, a transparent panel carried by said hinges and adapted to cover said opening in one of its positions, a means for holding said panel at an angle on either the front or rear side of said window frame.

In testimony whereof I affix my signature in the presence of two witnesses.

CLARENCE J. BARLEY.

Witnesses:
J. T. HANLON,
C. L. GROFF.